(12) United States Patent
Citrynell et al.

(10) Patent No.: US 6,779,438 B1
(45) Date of Patent: Aug. 24, 2004

(54) STEAMER/SMOKER GRILLING DEVICE FOR FOWL

(75) Inventors: Andrew Citrynell, 264 Sunrise La., Carbondale, CO (US) 81623; Kimberly Ann Miller, Carbondale, CO (US)

(73) Assignee: Andrew Citrynell, Carbondale, CO (US)

( * ) Notice: Subject to any disclaimer, the term of this patent is extended or adjusted under 35 U.S.C. 154(b) by 0 days.

(21) Appl. No.: 10/400,988

(22) Filed: Mar. 26, 2003

(51) Int. Cl.$^7$ .............................. A47J 43/18; A47J 37/08
(52) U.S. Cl. ........................ 99/347; 99/421 V; 99/426; 426/510; 426/523
(58) Field of Search ...................... 99/345, 347, 421 V, 99/426, 419; 426/510, 509, 523

(56) References Cited

U.S. PATENT DOCUMENTS

| | | | | |
|---|---|---|---|---|
| 5,301,602 A | * | 4/1994 | Ryczek | 99/345 |
| 6,062,131 A | * | 5/2000 | Holland | 99/345 |
| 6,119,585 A | | 9/2000 | Guidry | |
| 6,487,964 B2 | * | 12/2002 | Snoke et al. | 99/345 |
| 6,502,501 B1 | * | 1/2003 | Simon | 99/345 |
| 6,502,503 B1 | * | 1/2003 | Bell et al. | 99/419 |
| 6,503,551 B1 | | 1/2003 | Hester | |
| 6,530,308 B1 | | 3/2003 | Lin | |

* cited by examiner

Primary Examiner—Reginald L. Alexander
(74) Attorney, Agent, or Firm—Townsend and Townsend and Crew LLP

(57) ABSTRACT

A grilling system comprises a heat conductive grilling base having a bottom end and top end. The base defines a cavity that extends to the open top end. A grill member has an open bottom end, an open top end, and a conduit passing from the bottom end to the top end. The grill member is configured to be coupled to the grilling base so as to extend vertically upward from the top end of the base to permit a fowl to be inserted over the grill member and rest on the base while also permitting smoke or steam rising from the cavity to pass through the grill member to flavor the fowl.

8 Claims, 4 Drawing Sheets

STEAMER/SMOKER GRILLING DEVICE FOR FOWL

BACKGROUND OF THE INVENTION

This invention relates generally to the field of cooking fowl, and in particular to providing steam and/or smoke to the internal body cavity of the fowl using a grill.

Traditional techniques for cooking fowl generally require the fowl to be placed in a roasting pan that is then inserted into an oven. While roasting is perhaps the most popular way to cook fowl, grilling is another common technique. Grilling may be accomplished by cutting up the fowl and grilling the individual pieces, by placing the entire fowl on a grill, by using a rotisserie, and the like.

Another grilling technique is to place a beer or soda pop can into the interior of the fowl. One example of this technique is described in U.S. Pat. No. 6,503,351, the complete disclosure of which is herein incorporated by reference.

The invention provides other alternatives from cooking fowl using various grilling techniques. In so doing, the invention permits the internal body cavity of the fowl to be cooked while also providing flavoring using smoke and/or liquid vapors that are delivered to the internal cavity of the fowl.

BRIEF SUMMARY OF THE INVENTION

As just alluded to, the invention provides systems and methods for cooking fowl in such a way that heat is provided not only to the external part of the fowl, but also to the internal body cavity of the fowl by using grilling techniques. Further, the internal cavity of the fowl may be flavored and moistened using smoke and/or liquid vapors.

In one embodiment, the invention provides a grilling system that comprises a heat conductive grilling base having a bottom end and an open top end. The bottom end is configured to be placed onto a conventional grill. The base defines a cavity that extends to the open top end. The system further comprises a grill member having an open bottom end, an open top end, and a conduit passing from the bottom end to the top end. The grill member is configured to be coupled to the grilling base so as to extend vertically upward from the top end of the base. In this way, a fowl may be inserted over the grill member and rest on the base while also permitting smoke or steam rising from the cavity to pass through the grill member to flavor the fowl.

The grill member may be provided with a plurality of holes distributed between the top end and the bottom end to permit the smoke or steam to also pass laterally outward into the fowl. In this way, the interior of the fowl may be flavored while also being grilled.

In one aspect, the grill member maybe constructed of metal and be cylindrical in geometry. The base may also be constructed of metal and be generally conical in geometry. In this way, the base transfers heat from the grill to the grill member, while also providing appropriate stability to the fowl.

In another aspect, the base and the grill member may each include a connector to permit the grill member to be coupled to the base. For example, the connectors may comprise threads to permit the grill member to be screwed into the base.

One particular feature is the use of an insert that maybe placed within the cavity to hold a liquid. When the base is heated, the steam passes up through the grill member and into the fowl. Conveniently, the insert may comprise a cup shaped member that is constructed from a ceramic or other material capable of hold liquid and being heated to grill temperatures. Following grilling, the system may be disassembled and placed into a dishwasher for easy cleaning.

The invention also provides an exemplary method for cooking fowl. The method utilizes a heat conductive grilling base having a bottom end and an open top end. The base defines a cavity that extends to the open top end. A substance, such as a liquid or wood chips, is placed into the cavity. If a liquid is used, the liquid is preferably placed into a container or insert (such as a ceramic insert) that is placed into the cavity. A grill member is coupled to the base and has an open bottom end, an open top end, a conduit passing from the bottom end to the top end, and a plurality of openings distributed between the top end and the bottom end. The grill member is coupled to the base so as to extend vertically upward from the top end of the base. A fowl is placed over the grill member such that the grill member extends upward into the fowl's body cavity, with the base holding the fowl in a generally vertical orientation. The base is heated to transfer heat to the grill member and to cause the substance to smoke or steam, with the smoke or steam passing up through the conduit and into the fowl through the openings and through the open top end of the grill member.

To heat the base, it may be placed onto a barbecue grill or other heating element. When using wood chips, they may be placed directly into the cavity. When using a liquid, it may be placed directly into the cavity or it may be poured into an insert that is placed into the cavity. Further, the liquid may be seasoned.

The various components may be detached from each other to facilitate cleaning. For example, the grill member may be screwed into the base to couple to grill member to the base.

In one aspect, the base may comprise a metal fashioned in a conical shape to permit greases from the fowl to run down the base and into the barbecue grill. However, other shapes may be used, such as square, pyramidal, rectangular, cylindrical, hour glass and the like. Also, the grill member may also have a variety of shapes. Further, the grill member may comprise a metal fashioned in a cylindrical shape such that heat from the base is transferred to the interior of the fowl via the grill member.

DETAILED DESCRIPTION OF THE INVENTION

Figure 1:
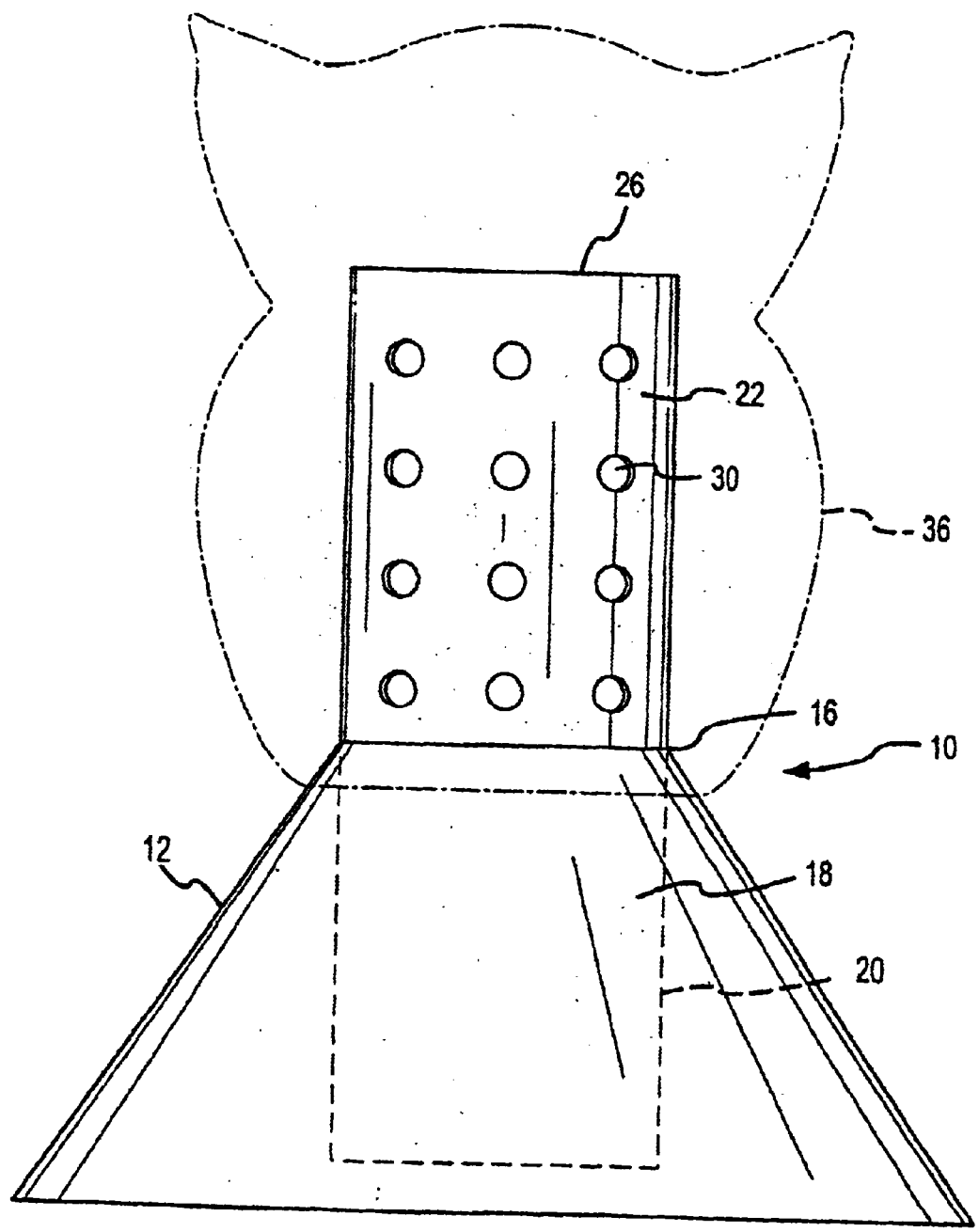
FIG. 1 is a front view of an embodiment of a grilling system according to the invention.

The invention provides grilling systems and methods that may be used to cook fowl and other meats and vegetables. One particular advantage of the invention is that a grill or other heating element may be used to heat a grill material that is placed within the fowl while also permitting the fowl to be steamed and/or smoked. To do so, the fowl may be placed onto a grill member, such as a cylinder, that is held by a thermally conductive base. The cylinder may be made from a grill material to grill the meat. When used as a steamer, the steam from the liquid rises from the base and through the cylinder where it enters into the body cavity and flavors the fowl. When used as a smoker, the smoke rises in a similar manner to smoke the fowl while it is being cooked. Another feature is that the grilling systems may be sized to occupy only a portion of the grill upon which it rests. As such, other food items may be grilled in the traditional fashion on the same grill which is supplying heat to the grilling system.

When steaming, essentially any type of liquid may be used. Examples of liquids that may be used include wine, beer, soda pop, fruit and vegetable juices, water, liquid spices, along with any flavorings or other spices, and the like. The liquid may conveniently be placed into a holder, such as a ceramic or metal insert that in turn may be held within the base, or the liquid may be poured directly into the cavity of the base. The base may conveniently be constructed of a heat conductive material, such as metal, to transfer heat to the liquid as well as to the grill member. The base is preferably heavy enough to hold the fowl vertically, and may have a conical shape to permit fat and greases to drip downward where they run off the base and into the grill.

The grill member serves to hold the fowl upright while the base rests on a grill or other heating element. The grill member may have various openings to permit the vapor from the heated liquid to pass laterally outward into the fowl. If circular, such holes may have a diameter in the range from about 1/16 inch to about 1 inch. Other shaped holes may also be used and may have area dimensions. This process flavors and moistens the meat as the fowl is cooked from the inside due to contact from the heated grill member. The fowl also cooks externally due to the heat of the grill on which the base rests. Thus, flavoring, moisturizing and cooking occur at an accelerated rate, due to the fact that the fowl is being cooked from inside and out. This produces a better tasting, moister, faster cooking and healthier fowl.

When smoking, the insert may be removed from the base, and flavored, moist wood chips may be placed into the cavity in the base. The grill member may then be attached to the base, and the fowl placed onto the grill member. The base may then be placed onto a grill and heated to cause the chips to smoke. As the smoke rises from the chips, it passes through the holes in the grill member. This flavors the meat as the fowl is cooked from the inside due to contact from the heated grill member. The fowl also cooks externally from the heat of the grill on which the base is resting. Thus, smoking, flavoring and cooking all occur at an accelerated rate because the fowl is being cooked from the inside and out.

Following cooking, the device can be removed from the grill and separated into its component parts. These may be placed into the dishwasher for washing. This makes the process more hygienic than a regular grill, which often has residue remaining from previous uses.

Referring now to FIGS. 1–4, one embodiment of a grilling system 10 will be described. Grilling system 10 comprises a base 12 that is constructed of a thermally conductive material, such as a metal or other grill material commonly used with grills. Base 12 is shown as being generally conical in geometry, although other shapes may be used as well. However, the conical shape provides a low center of gravity to enable to base to support a fowl, as well as permitting fluids and greases from the fowl to flow down its sides and into the grill. Base 12 has a bottom end 14 that is configured to directly rest on a grill and an open top end 16. Formed within base 12 is a cavity 18 that may be used to hold a substance that is used to create a smoke or vapor. In some cases, the substance may be held directly in cavity 18, while in other cases, an insert 20 may be placed into cavity and used to hold the substance. Insert 20 may be constructed of any material that is bio-compatible with food and that may withstanding grilling temperatures. Examples of materials that may be used include ceramics, metals, composites, and the like. Insert 20 may easily be removed from cavity 18 for cleaning and to permit substances to be placed directly into cavity 18.

System 10 also includes a grill member 22 having an open bottom end 24, an open top end 26 and a conduit 28 (see FIG. 4) passing between the two ends. Grill member as shown is cylindrical in geometry, although it will be appreciated that other shapes may be used, including those specifically tailored to mate with the interior cavity of a particular fowl, meat, or vegetable. Formed within the walls of grill member 22 are holes 30 that permit smoke and/or vapors to pass laterally through grill member 22 and into a fowl.

Figure 2:
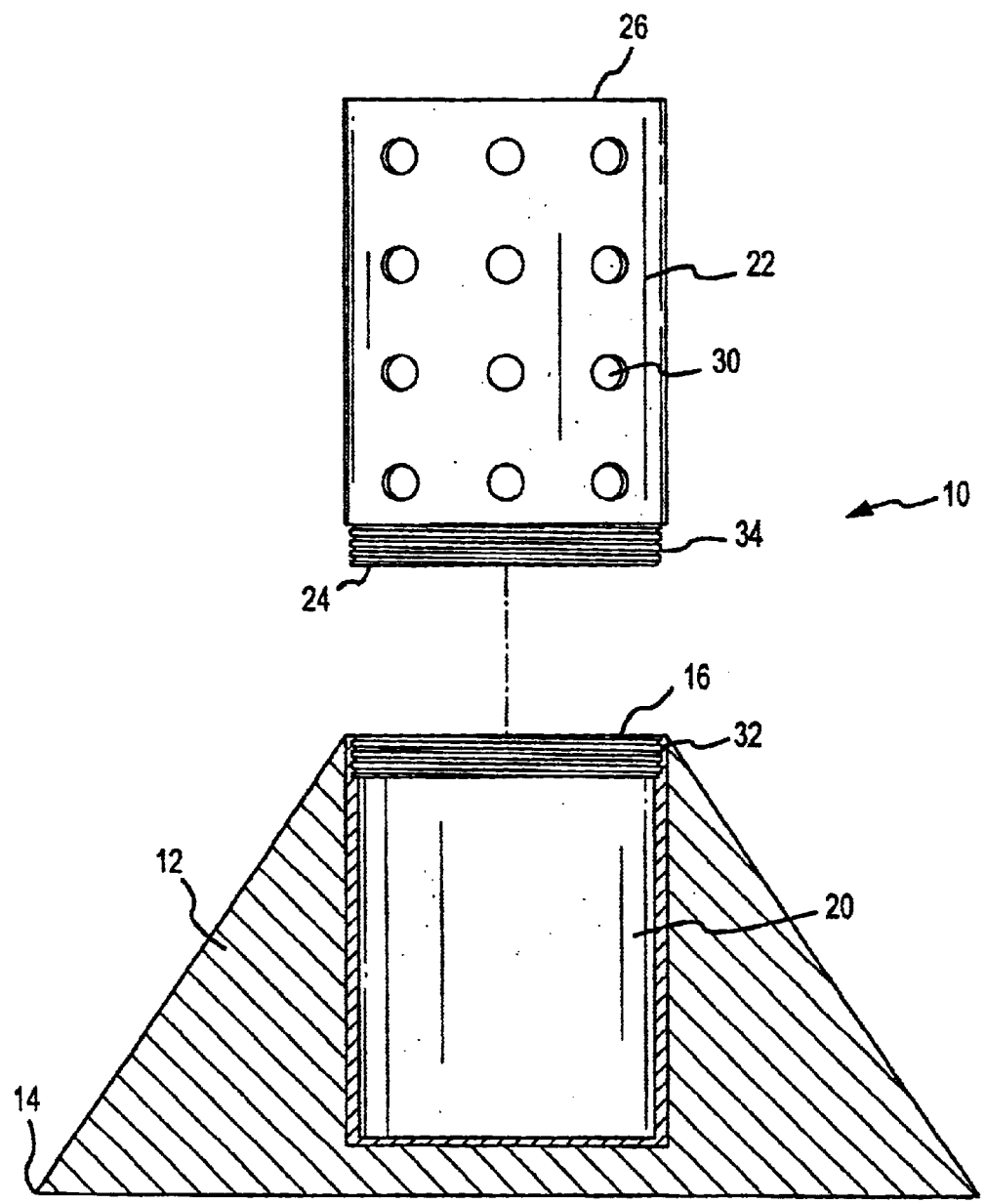
FIG. 2 is a partially exploded and cutaway side view of the grilling system of FIG. 1.
Figure 3:
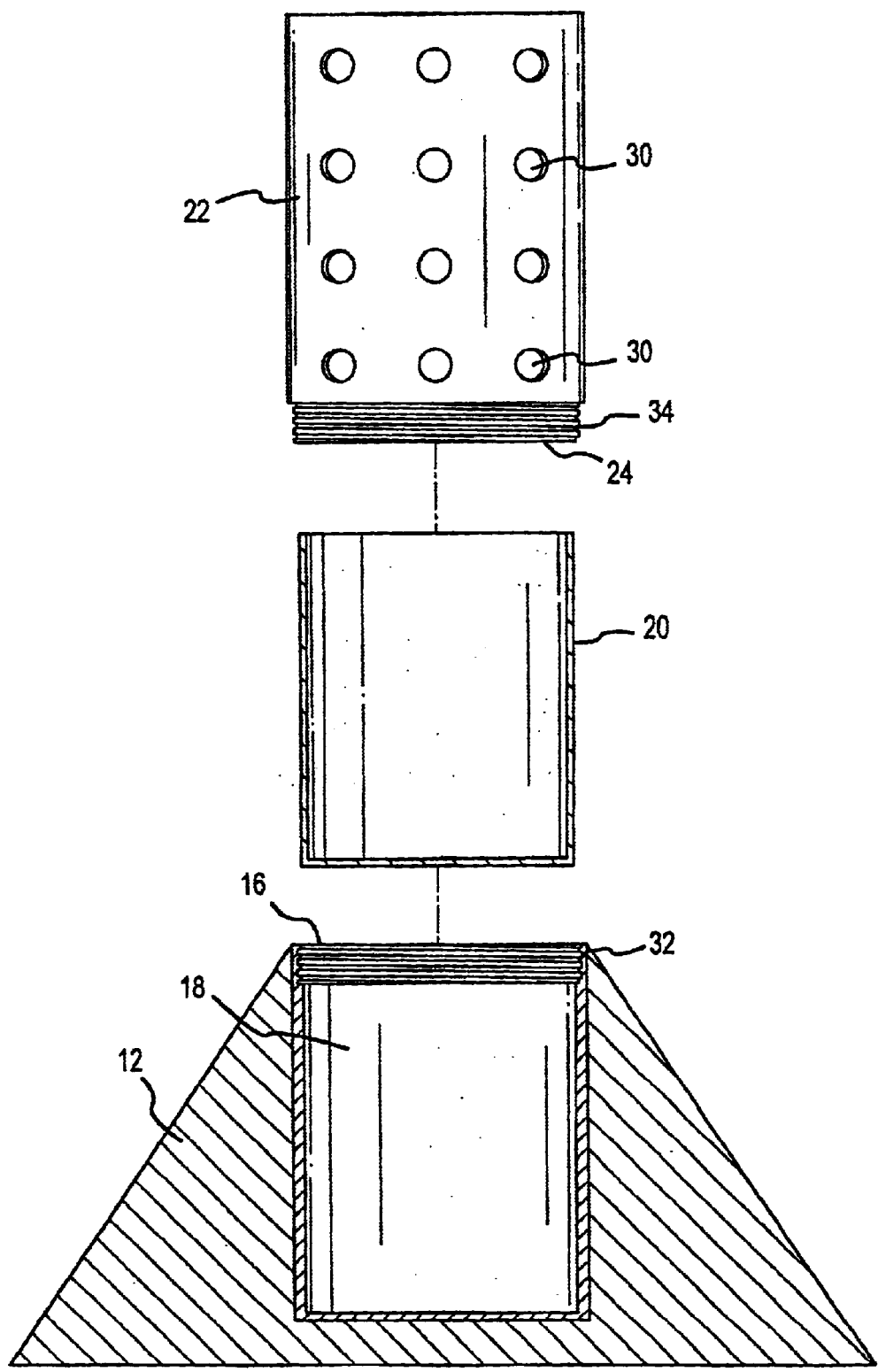
FIG. 3 is a fully exploded and partially cutaway side view of the grilling system of FIG. 1.
Figure 4:
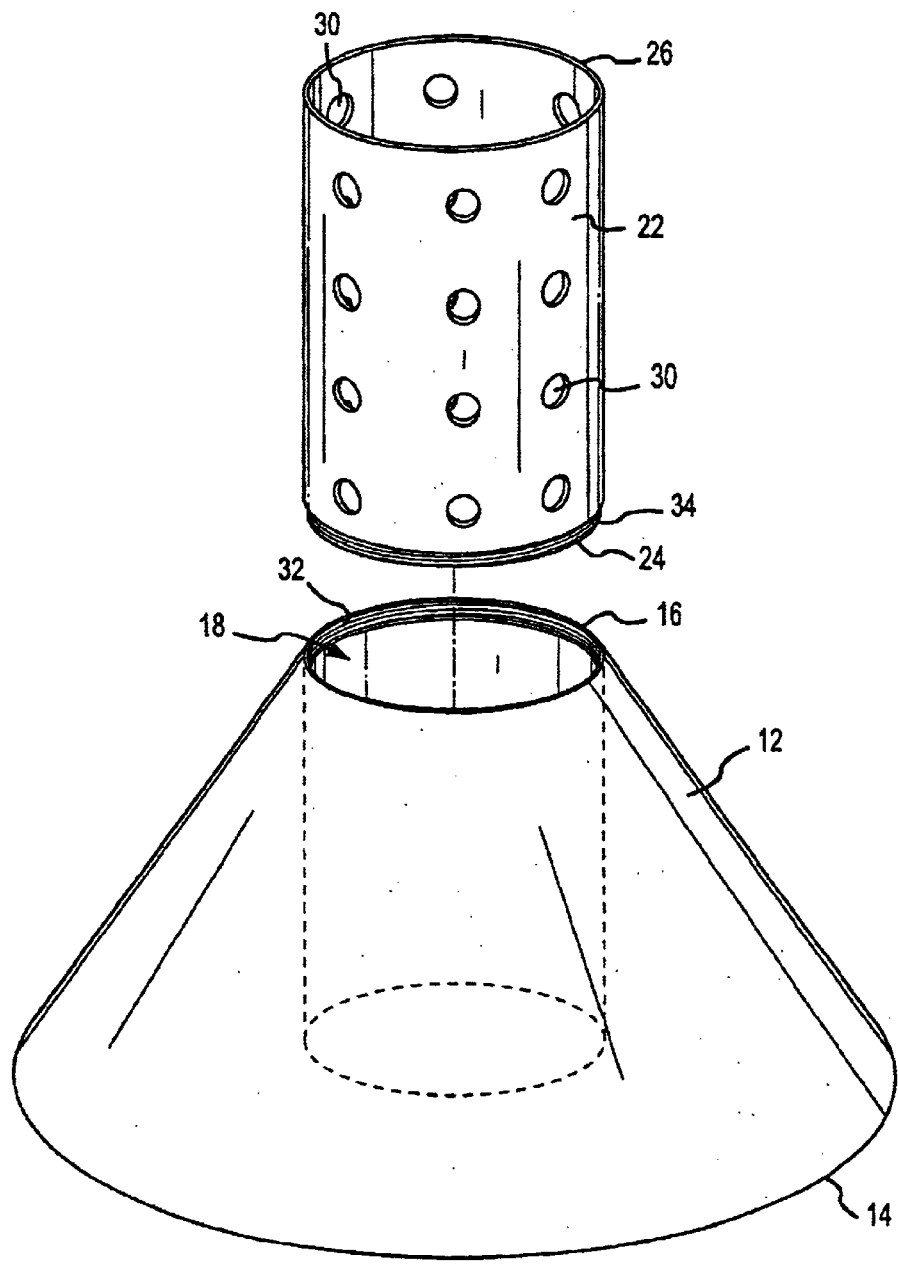
FIG. 4 is a top perspective view of the grilling system of FIG. 2.

As shown in FIGS. 2–4, base 12 includes threads 32 in top end 16 while grill member 22 also includes mating threads 34 at bottom end 24. In this way, grill member 22 may easily be screwed into base 12 to the position shown in FIG. 1. As such, grill member 22 may easily be removed, such as when needed to insert or remove insert 20, or for cleaning. Although shown with threads, it will be appreciated that other connectors may also be used, such as detents, clips, screws, or the like.

System 10 may be used in one of two modes. In one mode, insert 20 is not used. Instead, moist wood chips, liquids or other substances may be placed into cavity 18 and grill member 22 may be screwed into base 12. A fowl 36 (see FIG. 1) may be placed over grill member 22 such that grill member 22 fits within the internal body cavity of the fowl. The weight of the fowl causes the neck end of the fowl to rest upon the top of base 12. The conical shape of base 12 serves to prevent fowl 36 from sliding completely over base 12. Further, base 12 has a bottom end that is sufficiently wide and heavy to maintain the fowl in a generally upright orientation when base 12 is resting on the grill.

With base 12 resting on a grill, the grill may be heated to transfer heat directly to the fowl as well as to base 12. The heat from base 12 is transferred to grill member 22 to grill and cook the inside of the fowl. At the same time, the substance in cavity 18 is heated causing steam and/or smoke to pass upward through grill member 22 and out top end 26, as well as through holes 30 to moisten, cook and flavor the fowl. In this way, the fowl may be cooked both externally and internally while also moistening and flavoring the meat.

The second mode of operation is similar to the first mode except that insert 20 is included within cavity 18. A liquid may be poured into insert 20, either before or after grill member 22 is coupled to base 12. When heat is applied from the grill, the heat causes steam from the liquid within insert 20 to pass upwardly through grill member 22 in a manner similar to that previously described.

Following cooking, the fowl is removed from grill member 22. System 10 may then be disassembled for easy washing and cleaning. For example, each of the components may easily fit within a conventional dishwasher.

The invention has now been described in detail for purposes of clarity and understanding. However, it will be appreciated that certain changes and modifications may be practiced within the scope of the appended claims.

What is claimed is:

1. A grilling system, comprising:

a heat conductive grilling base having a bottom end and an open top end, wherein the base defines a cavity that extends to the open top end;

a grill member having an open bottom end, an open top end, and a conduit passing from the bottom end to the top end, wherein the grill member is configured to be coupled to the grilling base so as to extend vertically upward from the top end of the base to permit a fowl to be inserted over the grill member and rest on the base while also permitting smoke or steam rising from the cavity to pass through the grill member to flavor the fowl; and an insert separate from the grill member, wherein the insert is configured to fit within the cavity and hold a substance.

2. A method for cooking fowl, the method comprising:

providing a heat conductive grilling base having a bottom end and an open top end, wherein the base defines a cavity that extends to the open top end;

placing a substance into the cavity;

coupling a grill member to the base, wherein the grill member has an open bottom end, an open top end, a conduit passing from the bottom end to the top end, and a plurality of openings distributed between the top end and the bottom end, and wherein the grill member is coupled to the base so as to extend vertically upward from the top end of the base;

inserting a fowl over the grill member such that the grill member extends upward into the fowl's body cavity, with the base holding the fowl in a generally vertical orientation;

providing heat to the base to transfer heat to the grill member and to cause the substance to smoke or steam, with the smoke or steam passing up through the conduit and into the fowl through the openings and through the open top end of the grill member;

wherein the substance comprises a liquid; and further comprising pouring the liquid into an insert, and placing the insert into the cavity.

3. A method as in claim 2, further comprising placing the base onto a barbecue grill to provide the heat to the base.

4. A method as in claim 2, wherein the substance comprises moist wood chips that are placed into the cavity.

5. A method as in claim 2, further comprising providing a seasoning to the liquid.

6. A method as in claim 2, further comprising screwing the grill member into the base to couple to grill member to the base.

7. A method as in claim 3, wherein the base comprises a metal fashioned in a conical shape, and further comprising permitting greases from the fowl to run down the base and into the barbecue grill.

8. A method as in claim 2, wherein the grill member comprises a metal fashioned in a cylindrical shape such that heat from the base is transferred to the interior of the fowl via the grill member.

* * * * *